US009582331B2

(12) United States Patent
Murthy et al.

(10) Patent No.: US 9,582,331 B2
(45) Date of Patent: Feb. 28, 2017

(54) SYSTEM AND METHOD FOR A SMART OPERATING SYSTEM FOR INTEGRATING DYNAMIC CASE MANAGEMENT INTO A PROCESS MANAGEMENT PLATFORM

(71) Applicant: Wipro Limited, Bangalore (IN)

(72) Inventors: Shiva Murthy, Bangalore (IN); Hemant Kumar, Delhi (IN); Soham Bhaumik, Bangalore (IN); Amit Krishna, Bangalore (IN); Nithya Ramkumar, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/465,798

(22) Filed: Aug. 21, 2014

(65) Prior Publication Data

US 2015/0324244 A1    Nov. 12, 2015

(30) Foreign Application Priority Data

May 9, 2014    (IN) .......................... 2339/CHE/2014

(51) Int. Cl.
| | | |
|---|---|---|
| *G06F 9/455* | (2006.01) | |
| *G06F 13/00* | (2006.01) | |
| *G06F 9/50* | (2006.01) | |
| *G06F 9/54* | (2006.01) | |
| *G06F 9/46* | (2006.01) | |

(52) U.S. Cl.
CPC ............. *G06F 9/5038* (2013.01); *G06F 9/455* (2013.01); *G06F 9/466* (2013.01); *G06F 9/546* (2013.01); *G06F 13/00* (2013.01)

(58) Field of Classification Search
CPC .......... G06F 9/546; G06F 9/455; G06F 9/466; G06F 13/00
See application file for complete search history.

(56) References Cited

U.S. PATENT DOCUMENTS 6,990,666 B2 * 1/2006 Hirschfeld .............. G06F 9/485
                                                                  709/203
8,762,531 B1    6/2014 Yemini et al.
(Continued)

OTHER PUBLICATIONS

Gambi, "RESTful Business Process Management in the Cloud", IEEE, May 2013, pp. 1-10.*
(Continued)

*Primary Examiner* — Lechi Truong
*Assistant Examiner* — Phuong N Hoang
(74) *Attorney, Agent, or Firm* — Finnegan, Henderson, Farabow, Garrett & Dunner LLP

(57) ABSTRACT

This disclosure relates generally to systems and methods of operating systems and more particularly to systems and methods for a smart operating system for integrating dynamic case management into a process management platform. In one embodiment, a computer-implemented dynamic case management method includes creating a plurality of lightweight stateless computing processes; placing the processes in a WAIT state; receiving a request to initiate a process instance corresponding to a lightweight stateless process; placing at least one of the processes in an EXECUTING state; processing the process instance by the processes placed in the EXECUTING state; determining a next process for the process instance; and routing the process instance to the next process.

25 Claims, 7 Drawing Sheets

(56) References Cited

U.S. PATENT DOCUMENTS

| | | | | |
|---|---|---|---|---|
| 8,799,400 | B2* | 8/2014 | Watte | H04L 12/5815 709/206 |
| 9,396,039 | B1* | 7/2016 | Arguelles | G06F 9/5083 |
| 2003/0182261 | A1* | 9/2003 | Patterson | H04L 67/1036 |
| 2011/0047555 | A1* | 2/2011 | Lakshmanan | G06F 9/5088 718/105 |
| 2012/0331118 | A1* | 12/2012 | Stein | G06Q 10/067 709/223 |
| 2013/0061220 | A1* | 3/2013 | Gnanasambandam | G06F 9/45558 718/1 |

OTHER PUBLICATIONS

Andrews, "Business Process Execution Language for Web Services", May 3, 2003, version 1.1, pp. 1-136.*
Ollier, "Towards Automatic QOS Aware Restful Service Composition: Security Domain", Nov. 2012, pp. 1-66.*
Duipmans, "Business Process Management in the cloud" Business Process as a Service (BPaaS), Apr. 1, 2012, pp. 1-48.*

* cited by examiner

SYSTEM AND METHOD FOR A SMART OPERATING SYSTEM FOR INTEGRATING DYNAMIC CASE MANAGEMENT INTO A PROCESS MANAGEMENT PLATFORM

PRIORITY CLAIM

This U.S. patent application claims priority under 35 U.S.C. §119 to: Indian Patent Application No. 2339/CHE/2014, filed May 9, 2014. The aforementioned applications are incorporated herein by reference in their entirety.

TECHNICAL FIELD

This disclosure relates generally to systems and methods of operating systems, and more particularly to systems and methods for operating systems for integrating dynamic case management into a process management platform.

BACKGROUND

Conventional business process management (BPM) systems require significant resources to properly implement, manage, and execute BPM initiatives. Current BPM systems model initiatives as an ordered graph of events, which represent the activities performed for the BPM initiative, triggered by an event. This static approach sequesters scarce processing resources and fails to adapt to changing BPM needs. As BPM implementation scales up, the central coordination engine of this approach cannot withstand the increased load.

SUMMARY

In one embodiment, a computer-implemented dynamic case management method includes creating, by one or more hardware processors, a plurality of lightweight stateless computing processes based on process definitions in a configuration file that correspond to an activity; placing the processes in a WAIT state; receiving a request to initiate a process instance corresponding to a lightweight stateless process; placing at least one of the processes in an EXECUTING state; processing the process instance by the processes placed in the EXECUTING state; determining a next process for the process instance; and routing the process instance to the next process.

In another embodiment, a dynamic case management system includes one or more hardware processors and a computer-readable medium that stores instructions. When the instructions are executed by the one or more hardware processors, the one or more hardware processors to perform operations including creating, by one or more hardware processors, a plurality of lightweight stateless computing processes based on process definitions in a configuration file that correspond to an activity; placing the processes in a WAIT state; receiving a request to initiate a process instance corresponding to a lightweight stateless process; placing at least one of the processes in an EXECUTING state; processing the process instance by the processes placed in the EXECUTING state; determining a next process for the process instance; and routing the process instance to the next process.

In another embodiment, a non-transitory computer-readable medium stores instructions. When the instructions are executed by one or more hardware processors, the hardware processors perform operations. The operations include creating, by one or more hardware processors, a plurality of lightweight stateless computing processes based on process definitions in a configuration file that correspond to an activity; placing the processes in a WAIT state; receiving a request to initiate a process instance corresponding to a lightweight stateless process; placing at least one of the processes in an EXECUTING state; processing the process instance by the processes placed in the EXECUTING state; determining a next process for the process instance; and routing the process instance to the next process.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
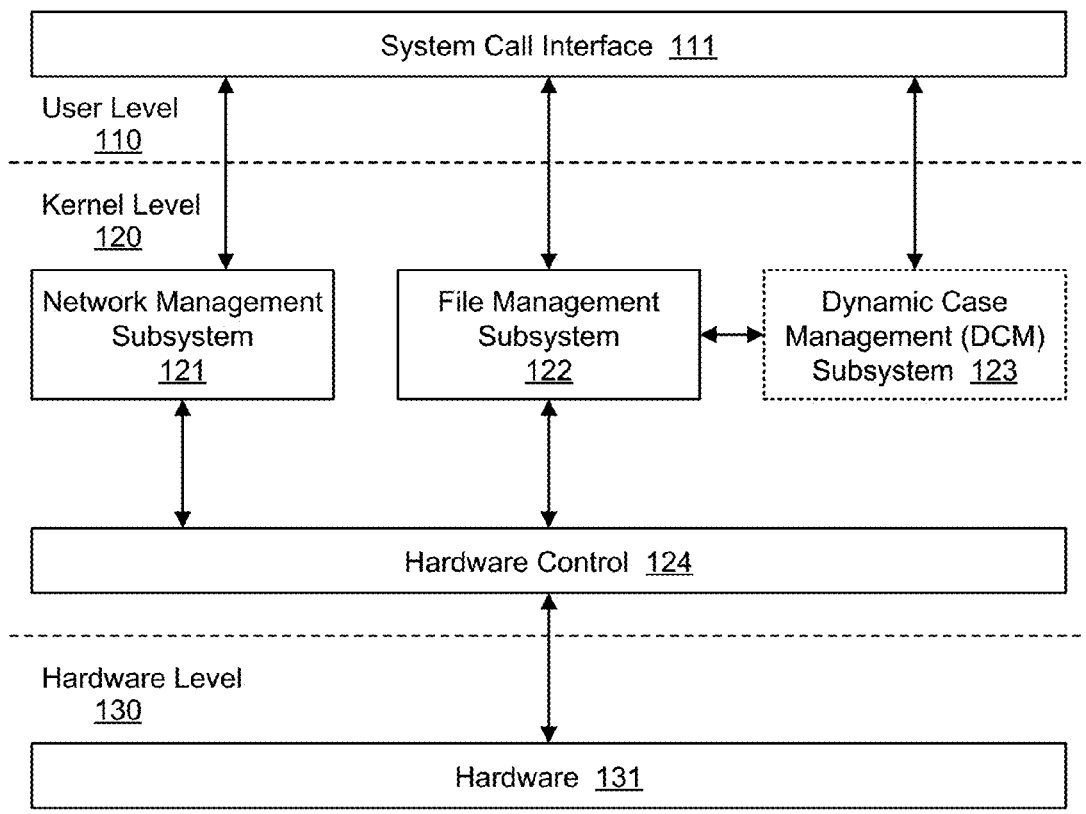
FIG. 1 illustrates an exemplary smart operating system according to some embodiments of the present disclosure.

FIG. 1 illustrates an exemplary smart operating system according to some embodiments of the present disclosure. Smart operating system 100 may include three different computer hierarchical levels: User level 110, kernel level 120, and hardware level 130. The dichotomy of the levels may allow for each level to function independently while providing services to other levels.

User level 110 may include system call interface 111. User level 110 may allow a user to access smart operating system 100. System call interface 111 may perform standard system call functions, allowing a program to request a service from kernel level 120. System call interface 111 may provide hardware-related service (e.g., hard disk access), process creation services, and access to kernel service (e.g., process scheduling). Further examples of system calls facilitated by system call interface 111 may include read, write, close, wait, fork, exit, and kill. Other system calls are well known in the art and may be supported by system call interface 111. In this regard, system call interface 111 may operate as a membrane between kernel level 120 and user level 110. The specific implementation of system call interface 111 may be dependent upon the underlying hardware. In certain embodiments, system call interface 111 may operate using software interrupts to allow the transfer of control of kernel level 120.

Kernel level 120 may be divided into several subsystems, such as network management subsystem 121, file management subsystem 122, DCM subsystem 123, and hardware control 124. Network management subsystem 121 may allow kernel level 120 to allocate requests from an application to perform input-output operations on peripherals, such as network adapters. This may allow smart operating system 100 to register itself with, and communicate over, a network, such as a packet-switched network. File management subsystem 122 may allow access to the device's memory, accessing data and instructions. File management subsystem may be, for example, a NTFS file system, or another type of file system.

As shown, DCM subsystem 123 may have taken the place of the standard process management subsystem. The specifics of DCM subsystem 123 are discussed in more detail in relation to FIG. 2. Process management subsystems may be responsible for running and executing programs. Further, process management subsystems, such as DCM subsystem 123, may decide which programs should be allocated to the processor hardware and the sequence of the allocations.

Hardware level 130 may include hardware 131. Hardware 131 may include one or more processors, storage (e.g., RAM, ROM, hard disks), chipsets, and peripherals (e.g., network card, video card, mouse, keyboard, camera, microphone, etc.). Hardware 131 may interact with the subsystems of kernel level 120 via hardware control 124. Hardware 131 may include the hardware illustrated in FIG. 7 (e.g., processor 702, RAM 713, ROM 714, input device(s) 704, output device(s) 705, etc.).

Figure 2:
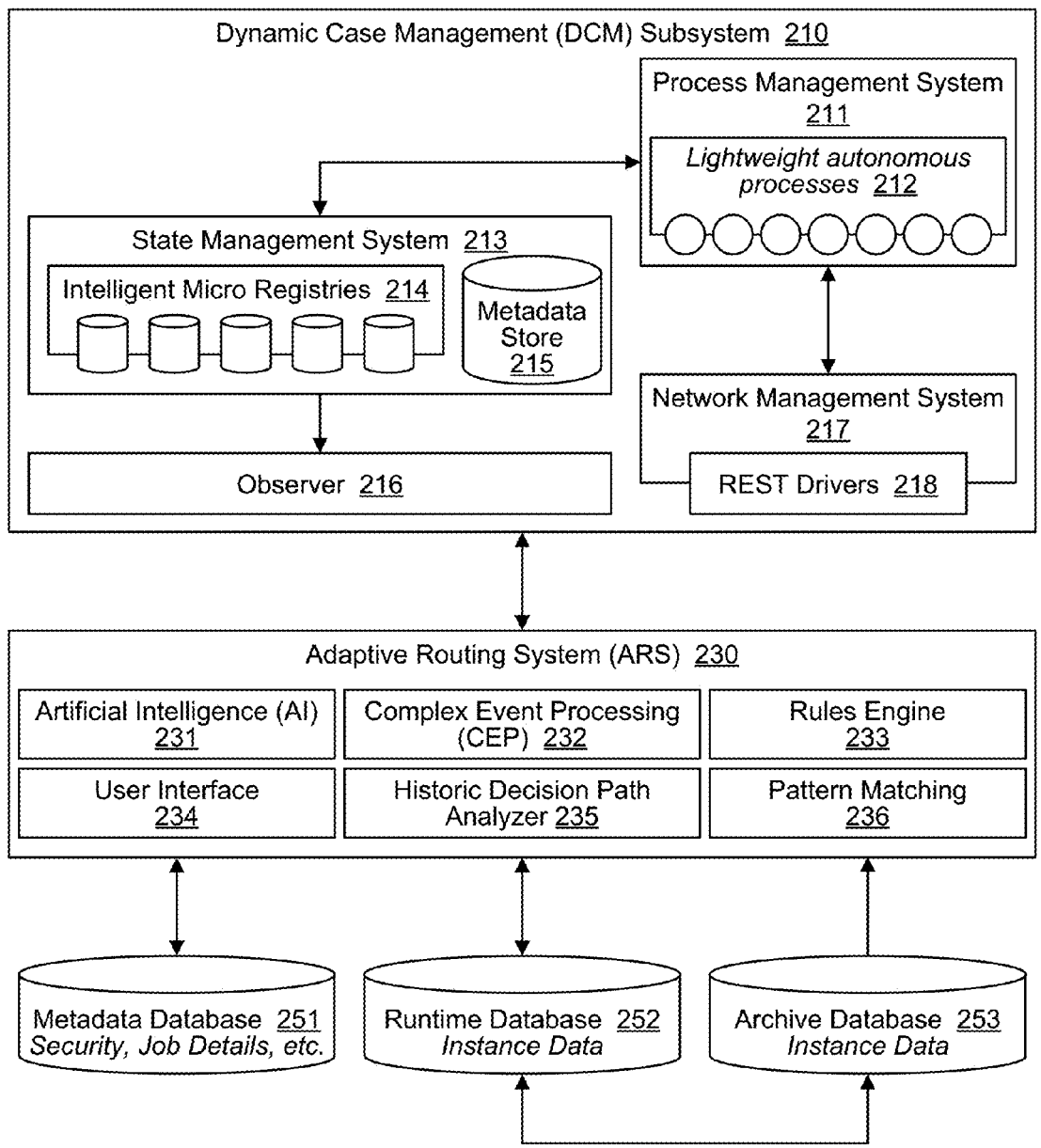
FIG. 2 is a functional block diagram according to some embodiments of the present disclosure.

FIG. 2 is a functional block diagram according to some embodiments of the present disclosure. System 200 includes DCM subsystem 210, which interacts with adaptive routing system (ARS) 230. DCM subsystem 210 includes process management system 211, state management system 213, observer 216, and network management system 217. These systems may interact to perform the objects of this disclosure.

Process management system 211 may include and manage lightweight autonomous processes 212. Lightweight autonomous processes 212 may be stateless processes that perform predefined operations independently. Process management system 211 may initiate lightweight processes based on previously defined process definitions which correspond to specific activities to be performed on different process instances. Process instances may be business process instances, corresponding to specific business procedures for business initiatives.

State management system 213 may include intelligent micro registries 214 and metadata store 215. Metadata store 215 may be a local or remote database. In an exemplary embodiment, metadata store 215 may include boot configuration data, which may provide process definitions for lightweight autonomous processes 212. For example, a process definition may specify a process type, process algorithms, failure handling mechanisms, input operations, output operations, triggers, or other rules. The boot configuration data may further provide default configurations to be initiated during system boot, such as how many lightweight autonomous processes to initiate for each type of activity. Other boot configuration data may include to put all lightweight autonomous processes 212 in a WAIT state or another state during boot. The boot configuration data of metadata store 215 may be managed by administrators using a configuration interface (e.g., a GUI).

Intelligent micro registries 214 may each correspond to an individual one of lightweight autonomous processes 212. Intelligent micro registries 214 may track and maintain the state of each lightweight autonomous process instance of lightweight autonomous processes 212. State management system 213 may maintain intelligent micro registries 214, which may also interact with observer 216 for runtime monitoring of each process and to determine the status of each process instance associate with each process, as well as any data used or produced by a process instance. In an exemplary embodiment, intelligent micro registries may be databases that are compatible with JavaScript Object Notation (JSON).

Observer 216 may track the state of various process including various process instances associated with them and the various activities that are performed at runtime. The tracking may be accomplished by querying intelligent micro registries 214 maintained by state management system 213 for each of the lightweight autonomous processes 212.

Network management system 217 may correspond to network management subsystem 121. Network management system 217 may include REST drivers 218 to enable each DCM node to connect and communicate with a central coordination system, such as Apache ZooKeeper, for example. REST drivers 218 may provide a flexible interface between applications and hardware. For example, applications or clients and the REST drivers may negotiate the communication protocol (e.g., HTTP, FTP, SOCKS, etc.) or the message format (e.g., XML, JSON, etc.). The application may communicate with REST drivers 218 during runtime. For example, applications may query REST drivers 218 for details of the functions that may be available in the underlying hardware. Network management system 217 may further connect with clusters of DCM nodes to scale horizontally or vertically based on the transactional load. By scaling DCM nodes in a decentralized manner, the core may be insulated from an individual node failure by transferring processes of the failed node to alternate nodes. Additional nodes may be added to address surges in demand.

Adaptive Routing System (ARS) 230 may connect to DCM subsystem 210 to provide routing services for each process instance, which may run on different nodes. ARS 230 may determine and route the process instances from one autonomous light weight process to another, based on the activity that corresponds to the lightweight autonomous process. To determine the next activity or lightweight autonomous process to route a process instance to, ARS 230 may use route-determination resources, such as artificial intelligence 231, complete event processing 232, rules engine 233, user interface 234, historic decision path analyzer 235, or pattern matching 236, for example. In an embodiment, multiple of the route-determination may be used in combination.

Artificial intelligence 231 may statistical methods and computational intelligence to mimic human perception and manipulation of the process instances. Complex event processing 232 may track and analyze data from multiple sources about past events to infer patterns for various process instances and activities or lightweight autonomous processes. Complex event processing 232 may gather information from intelligent micro registries 214, observer 216, metadata database 251, runtime database 252, archive database 253, or from sources over the Internet, such as the cloud and public databases. Rules engine 233 may utilize pre-defined rules to determine where to route a process instance. These rules may be simple, such as basic logic statements, or more complex derivations including numerous variables.

User interface 234 may utilize human input via a runtime execution graphical user interface (GUI) to manipulate routing decisions. A runtime execution GUI may enable a user or a group of users to view the runtime state of each lightweight autonomous process and each process instance. Runtime execution GUI may also receive input from a user or group of users, translate the input, and transmit the input to ARS 230. For example, a runtime execution GUI may show a list of the lightweight autonomous processes and relevant information, such as the queue size, status, and the type of activity that the lightweight autonomous process corresponds to. Further, a runtime execution GUI may sort a list of lightweight autonomous processes by queue size. A runtime execution GUI may also receive input for a user directing process management system 211 to create additional lightweight autonomous processes to perform the activity of the lightweight autonomous process with the largest queue. In other embodiments, user interface 234 may simply be a prompt that receives a confirmation for a specific course of action previous calculation using other route-determination resources. In other embodiments, the user may be presented with multiple options to pick from, or may directly decide how individual process instances may be routed. In other embodiments, user interface 234 may include a human user's ability to override current routing functions to correct erroneous routing or prioritize process instances of high importance.

Historic decision path analyzer 235 utilizes past data to derive what routing decision was most utilized in previous routing determinations. Historic decision path analyzer may utilize information from intelligent micro registries 214, observer 216, metadata database 251, runtime database 252, archive database 253, or from sources over the Internet. Pattern matching 236 may utilize tree structures or sequences to determine if a perceived sequence or routing decision constitutes a pattern. Pattern matching 236 may identify patterns of activities that are heavily used by processes to determine improved routing and resource balancing of lightweight autonomous processes.

Metadata database 251 may be a persistence unit, such as a database or file system, that stores all the core lightweight autonomous process definitions, associated rules, tasks, jobs, scheduling information, security, and other associated context information. Metadata database 251 may assist in managing and executing the processes and managing the DCM scenarios.

Runtime database 252 may be a main persistence unit, such as a database, that stores the dataset for various process instances. It may include all of the instance data for various processes.

Archive database 253 may be a persistence unit, such as a database, that stores all of the archived datasets for various processes. In an embodiment, when runtime database 252 exceeds a limit in size or when data in runtime database 252 exceeds an age limit, the data of runtime database 252 may be transferred from runtime database 252 to archive database 253, to maintain historical data, which may be used for future reference or compliance reasons. The size limit may be pre-defined based on user preferences or compliance regulations. In other embodiments, the size limit may be derived from the available storage in runtime database 252. The age limit may also be set based off of user preferences or compliance regulations.

Figure 3:
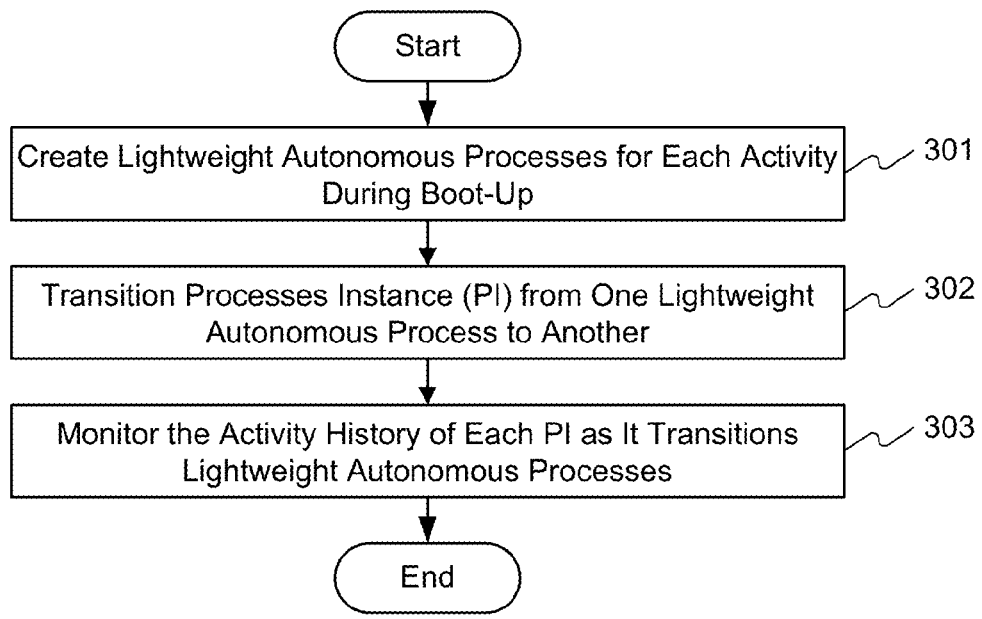
FIG. 3 is a flow diagram illustrating an exemplary dynamic case management (DCM) subsystem process in accordance with some embodiments of the present disclosure.

FIG. 3 depicts a flow diagram illustrating an exemplary dynamic case management (DCM) subsystem process in accordance with some embodiments of the present disclosure. Process 300 may begin with step 301, which may spawn lightweight autonomous processes based on process definitions during boot up. Step 301 may be described in more detail in FIG. 4.

Figure 4:
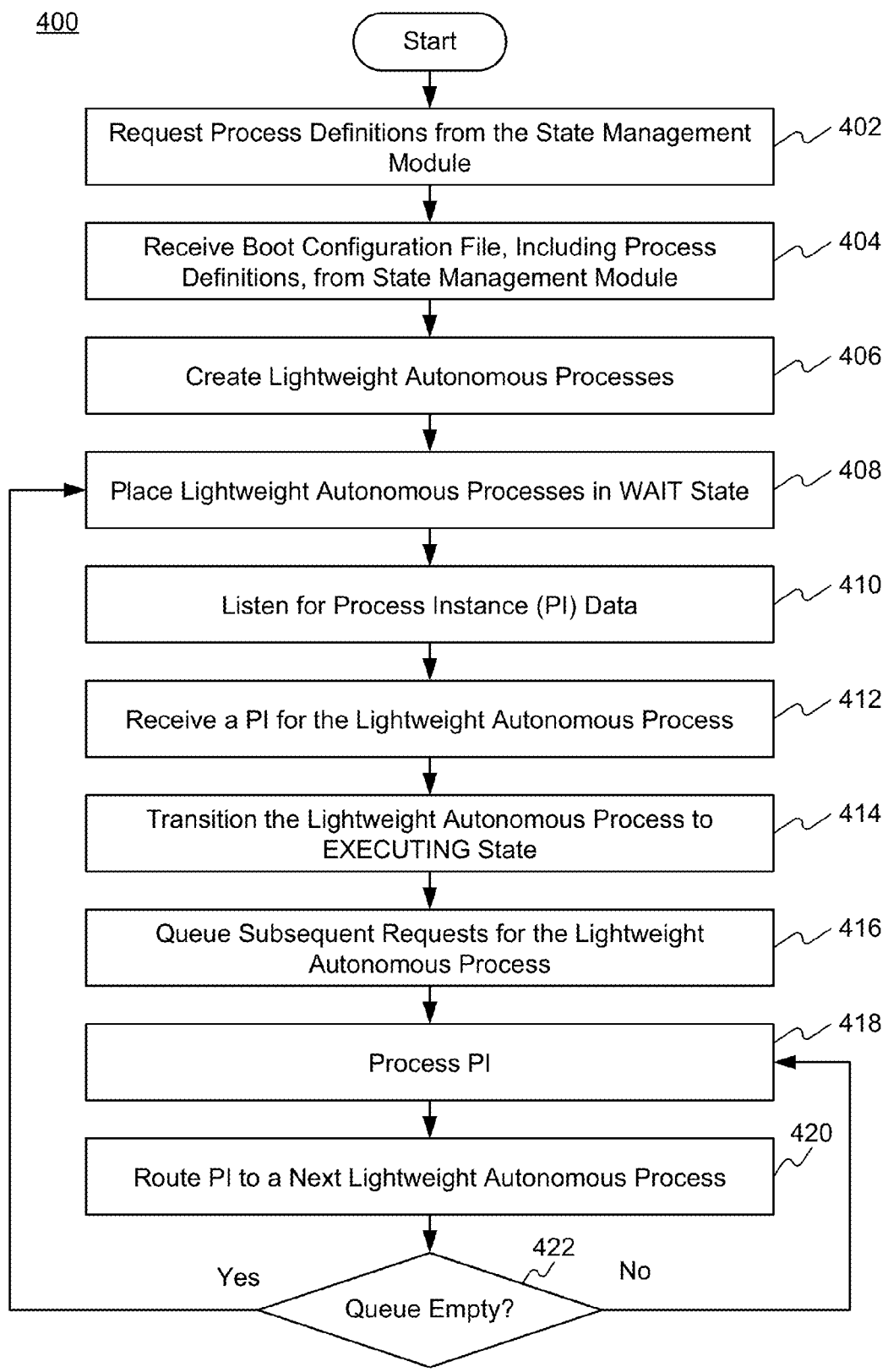
FIG. 4 is a flow diagram illustrating an exemplary lightweight process management process in accordance with some embodiments of the present disclosure.

FIG. 4 is a flow diagram illustrating an exemplary lightweight process management process in accordance with some embodiments of the present disclosure. Process 400 may begin with step 402, during which process management system 211 may request process definitions, stored in metadata store 215, from state management system 213. At step 404, process management system 211 may receive the boot configuration file or the associated data, which includes process definitions from state management system 213. The process definitions may express the activity associated with the process, including the quantity of lightweight autonomous process that should be spawned for each type of activity. At step 406, process management system 211 may create the lightweight autonomous process according the boot configuration data received in step 404. At step 408, process management system 211 may place the lightweight autonomous processes 212 in a WAIT state. This may happen as each lightweight autonomous process is created or all at once when all the lightweight autonomous processes have been created.

At step 410, each lightweight autonomous process may listen for PI data. In certain embodiments, after a predetermined amount of time has passed without receiving any PI data, a lightweight autonomous process may be placed in a hibernation state. Further, a lightweight autonomous process may be shut down based on a predetermined about of time spend in a hibernation state or in a WAIT state. This may allow process management system 211 to allocate processing resources based on the demands of the active process instances.

At step 412, a lightweight autonomous process may receive PI data. The PI data may correspond to the activity that the lightweight autonomous process performs. At step 414, the lightweight autonomous process may transition to an EXECUTING state, responsive to receiving the PI data in step 412.

At step 416, consecutive requests, including data for additional PIs, may be queued for subsequent processing. In an exemplary embodiment, process management system 211 may track the status of the queue for each of the lightweight autonomous processes and may create additional lightweight autonomous processes based on the process definition of a particular activity, when the queues for processes of that activity are all full or overburdened. In an exemplary embodiment, the queue may function as a first-in-first-out (FIFO) queue. Other queuing techniques, such as last-in-first-out (LIFO), may be used to carry out the objects of this disclosure depending upon the user preferences.

At step 418, the lightweight autonomous, which may now be in the EXECUTING state, may process the PI data. For example, the lightweight autonomous process may perform the corresponding activity on the PI using the PI data. At step 420, once the processing is complete, the PI may be routed to another lightweight autonomous to perform a different activity for the PI, based on the routing information from ARS 230.

At step 422, the lightweight autonomous process may check to see if its queue is empty. If there are pending requests in its queue, the lightweight autonomous process may receive the PI from its queue and, at step 418, process the PI. When there are no pending requests in its queue, the lightweight autonomous process may revert to the WAIT state, at step 408. In other embodiments, the lightweight autonomous process may be placed in a hibernation state or be shut down when its queue is empty.

Returning to FIG. 3, at step 302, the PI may be transitioned from one lightweight autonomous process to another. An embodiment of step 302 is described in more detail in FIG. 5.

Figure 5:
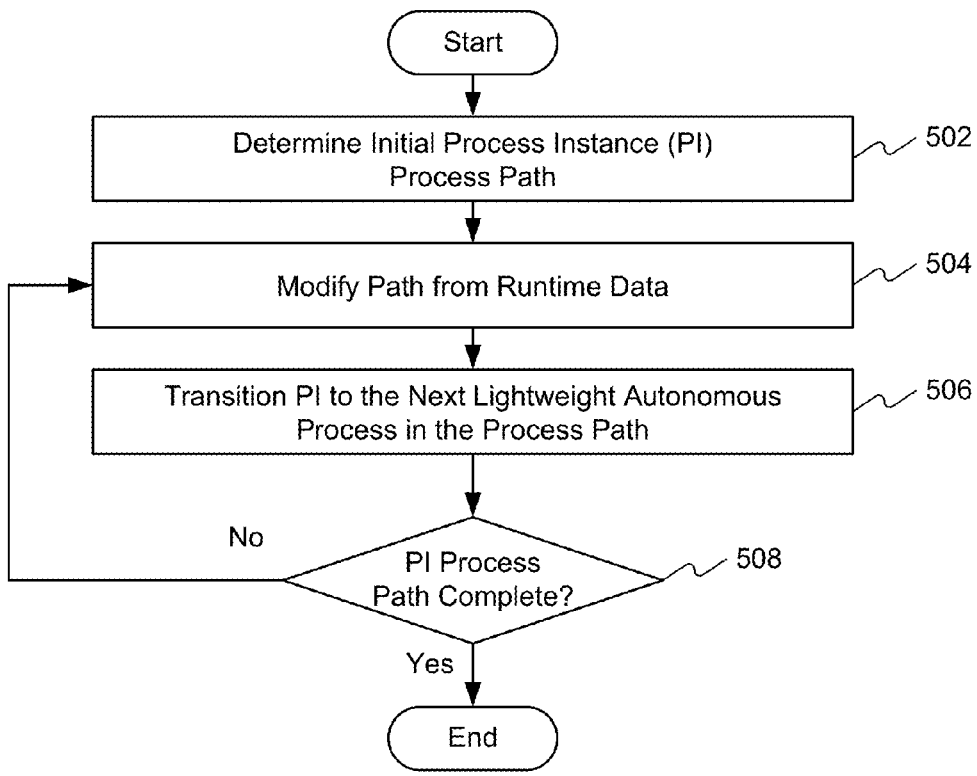
FIG. 5 is a flow diagram illustrating an exemplary Process Initiative (PI) routing process in accordance with some embodiments of the present disclosure.

FIG. 5 is a flow diagram illustrating an exemplary Process Initiative (PI) routing process in accordance with some embodiments of the present disclosure. At step 502, ARS 230 may determine an initial path for a PI through various lightweight autonomous processes. This path may be based on the objects of the PI and may utilize the same lightweight autonomous process multiple times.

Next, at step 504, ARS 230 may modify the path based on runtime data. This may take place when a PI has completed a particular lightweight autonomous process, such as in step 420. However, in certain embodiments the path may be modified based on other activity in a particular node or demand levels for various activities of the lightweight autonomous processes. For instance, the sequence of activities for a particular PI may be altered when the next activity the initial process path has an overburdened queue. In other embodiments, the path of the PI may be altered to route the PI to a lightweight autonomous process that has an empty queue, is in a WAIT state, or is in a hibernation state. Other modifications to the PI process path based on load balancing, efficiency, and user priorities.

At step 506, the PI may be transitioned to the next lightweight autonomous process on the modified path. This may occur as described in step 420. Then at step 508, ARS 230 may determine whether the process path for the PI is complete. In certain embodiments, if all processing necessary for a PI is completed, the routing process may end for the PI. Otherwise, process 500 may revert to step 504, where the path may be modified from further runtime data. In certain embodiments, PIs may have pre-determined lifespans, or may be ongoing and never end.

Returning to FIG. 3, following step 302, at step 303, state management system 213 may monitor the activity of each PI. State management system 213 may further record the process history of each PI, such as each lightweight autonomous process that acts on the PI. Step 303 is described in more detail with regard to FIG. 6.

Figure 6:
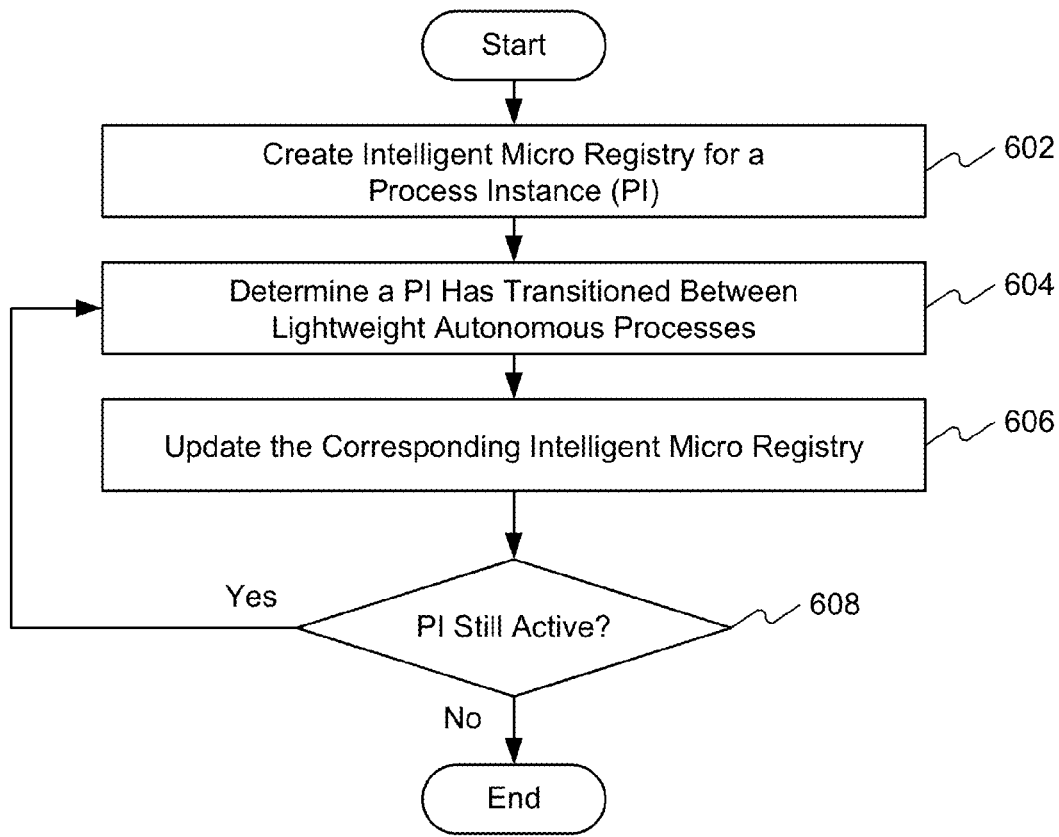
FIG. 6 is a flow diagram illustrating an exemplary PI tracking process in accordance with some embodiments of the present disclosure.

FIG. 6 depicts a flow diagram illustrating an exemplary PI tracking process in accordance with some embodiments of the present disclosure. At step 602, process 600 may begin with state management system 213 creating intelligent micro registries 214 for each PI. The intelligent micro registry creation may be performed responsive to the PI being first received at the node. In other embodiments, an intelligent micro registry may be created when a PI is first acted on by a lightweight autonomous process.

At step 604, the intelligent micro registry for a PI may determine that the PI has transitioned between lightweight autonomous processes, such as in step 420 or step 506, for example. At step 606, the intelligent micro registry may be updated based on the transition to include the lightweight autonomous process history, including, for example, the activities performed on the PI, a timestamp, a state of the PI, any variables of the PI that may have been altered, an identifier of the lightweight autonomous process, and an identifier of the node. Other events may trigger intelligent micro registry updates, such as errors that may occur when certain processes are performed or routing changes that may significantly alter the process path. For example, intelligent micro registries may note that a certain activity was performed out of conventional order because the process path was altered due to an overwhelming demand for the otherwise conventional activity at that time.

At step 608, state management system 213 or the corresponding one of intelligent micro registries 214 may determine whether the PI is still active. If the PI has completed and no longer is being processed or pending processing by a light weight autonomous process, such as if the PI process path is complete in step 508, process 600 may end, and the intelligent micro registry for the PI may stop monitoring the PI. In certain embodiments, the intelligent micro registry data may be archived as well. However, when it is determined that the PI is still active at step 608, process 600 may revert to step 604, determining if the PI has transitioned between lightweight autonomous processes.

Figure 7:
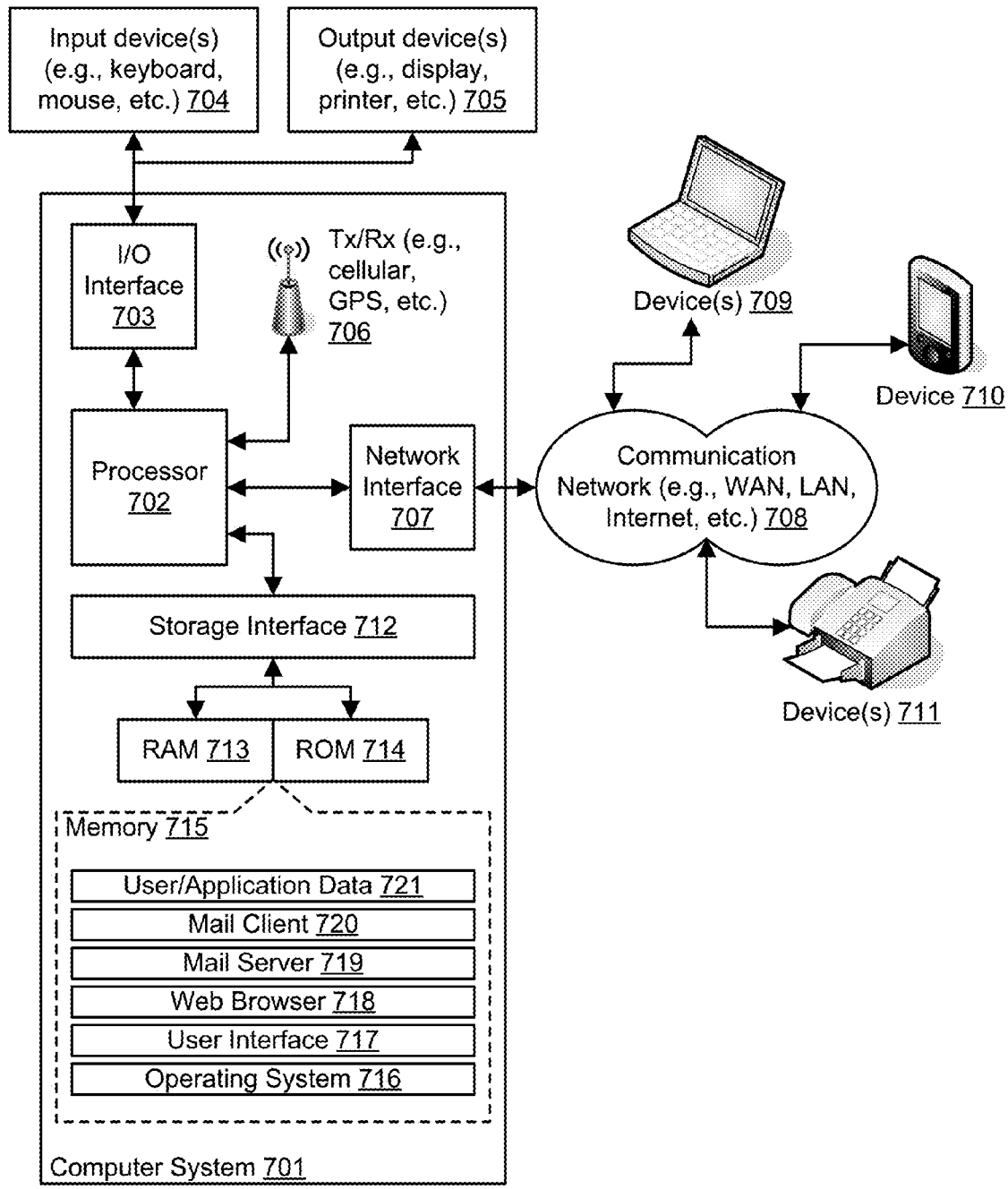
FIG. 7 is a block diagram of an exemplary computer system for implementing embodiments consistent with the present disclosure.

FIG. 7 is a block diagram of an exemplary computer system for implementing embodiments consistent with the present disclosure. Variations of computer system 701 may be used for implementing smart operating system 100 (including hardware level 130 and hardware 131), DCM subsystem 210 (including process management system 211, state management system 213, observer 216, and network management system 217), and ARS 230 (including artificial intelligence 231, complex event processing 232, rules engine 233, user interface 234, historic decision path analyzer 235, and pattern matching 236). Computer system 701 may comprise a central processing unit ("CPU" or "processor") 702. Processor 702 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 710, 711, and 712. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, file management subsystem 122, intelligent micro registries 214, metadata store 215, metadata database 251, runtime database 252, and archive database 253.

The memory devices may store a collection of program or database components, including, without limitation, an operating system 716, user interface 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 701 may implement a web browser 718 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as Apple Mail, Microsoft Entourage, Microsoft Outlook, Mozilla Thunderbird, etc.

In some embodiments, computer system 701 may store user/application data 721, such as the data, variables, records, etc. (e.g., PI data, lightweight autonomous process data, lightweight autonomous process identifiers, activity demand levels) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described systems and methods for a smart operating system for integrating dynamic case management into a process management platform. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer-implemented dynamic case management method, comprising:
   creating, by one or more hardware processors, a plurality of lightweight stateless computing processes based on process definitions in a configuration file that correspond to a plurality of activities associated with a process instance, wherein each the plurality of the activities is associated with each of the plurality of the lightweight stateless processes;
   determining a first path for routinq the process instance, wherein the path defines a sequence of the plurality of activities;
   placing a first process of the plurality of lightweight stateless computing processes in a WAIT state;
   receiving a request to initiate a process instance corresponding to the first process, the request including data associated with a first activity;
   placing the first process in an EXECUTING state after receiving the request;
   processing the process instance by the first process;
   placing subsequent requests including data associated with the first activity in a queue associated with the first activity;
   after the processing of the first process completes, determining a second activity based on the sequence of the plurality of activities defined by the first path;
   after determining that a queue associated with the second activity has a queue size that exceeds a predetermined threshold:
      determining a second path that defines an altered sequence of activities of the plurality of activities,
      storing, as a part of historical data, the altering of the sequence of activities,
      determining a next process for the process instance based on the altered sequence of activities, and
      routing the process instance to the next process;
   and
   tracking and monitoring a status of the process instance associated with each process;
   wherein additional lightweight stateless processes are created for an activity if a queue size associated with the activity exceeds the predetermined threshold.

2. The method of claim 1, further comprising:
   recording an identifier of at least one of the processes placed in the EXECUTING state and a timestamp in a micro registry corresponding to the process instance; and
   updating the micro registry to store the altering of the sequence of activities.

3. The method of claim 1, further comprising:
   determining that one of the processes placed in the EXECUTING state has an empty queue; and
   re-placing the process in the WAIT state.

4. The method of claim 1, wherein processing the process instance comprises: performing the activity associated with the process placed in the EXECUTING state on the process instance.

5. The method of claim 1, wherein determining the next process for the process instance comprises:
   receiving runtime data; and
   determining the next process based on the runtime data using at least one of: artificial intelligence, complex event processing, historic decision paths, pattern match, or predefined rules.

6. The method of claim 1, wherein determining the next process for the process instance comprises:
   determining that processing for the process instance is complete; and
   ending the process instance based on the determination.

7. The method of claim 1, wherein the configuration file includes a process type for the activity; a process algorithm for the activity; and a trigger for the activity that causes a process to perform the activity.

8. The method of claim 1, wherein the determination of the first path is based on the historical data.

9. The method of claim 1, wherein the determination of the first path is based on statistical methods and computational intelligence configured to mimic human perception and manipulation of the process instance.

10. The method of claim 1, wherein the determination of the first path comprises:
    determining whether a first sequence of the plurality of activities constitutes a pattern of activities;
    predicting queue sizes at a specific time point associated with the pattern of activities; and
    based on the predicted queue sizes, determining a second sequence of the plurality of activities to facilitate resource balancing;
    wherein the next process is determined based on the second sequence.

11. The method of claim 1, wherein if no request to initiate a process instance is received within a first predetermined amount of time, placing at least one of the processes in a hibernation state; and shutting down at least one of the processes that has spent a second predetermined amount of time in the hibernation state.

12. A dynamic case management system comprising:
one or more hardware processors; and
a computer-readable medium storing instructions that, when executed by the one or more hardware processors, cause the one or more hardware processors to perform operations comprising:
creating, by one or more hardware processors, a plurality of lightweight stateless computing processes based on process definitions in a configuration file that correspond to a plurality of activities associated with a process instance, wherein each the plurality of the activities is associated with each of the plurality of the lightweight stateless processes;
determining a first path for routing the process instance, wherein the path defines a sequence of the plurality of activities;
placing a first process of the plurality of lightweight stateless computing processes in a WAIT state;
receiving a request to initiate a process instance corresponding to the first process, the request including data associated with a first activity;
placing the first process in an EXECUTING state after receiving the request;
processing the process instance by the first process;
placing subsequent requests including data associated with the first activity in a queue associated with the first activity;
after the processing of the first process completes, determining a second activity based on the sequence of the plurality of activities defined by the first path;
after determining that a queue associated with the second activity has a queue size that exceeds a predetermined threshold:
determining a second path that defines an altered sequence of activities of the plurality of activities,
storing, as a part of historical data, the altering of the sequence of activities:
determining a next process for the process instance based on the altered sequence of activities, and
routing the process instance to the next process; and
tracking and monitoring a status of the process instance associated with each process;
wherein additional lightweight stateless processes are created for an activity if a queue size associated with the activity exceeds the predetermined threshold.

13. The system of claim 12, the operations further comprising:
recording an identifier of at least one of the processes placed in the EXECUTING state and a timestamp in a micro registry corresponding to the process instance; and
updating the micro registry to store the altering of the sequence of activities.

14. The system of claim 12, the operations further comprising:
determining that one of the processes placed in the EXECUTING state has an empty queue; and
re-placing the process in the WAIT state.

15. The system of claim 12, wherein processing the process instance comprises: performing the activity associated with the process placed in the EXECUTING state on the process instance.

16. The system of claim 12, wherein determining the next process for the process instance comprises:
receiving runtime data; and
determining the next process based on the runtime data using at least one of: artificial intelligence, complex event processing, historic decision paths, pattern match, or predefined rules.

17. The system of claim 12, wherein determining the next process for the process instance comprises:
determining that processing for the process instance is complete; and
ending the process instance based on the determination.

18. The system of claim 12, wherein the configuration file includes a process type for the activity; a process algorithm for the activity; and a trigger for the activity that causes a process to perform the activity.

19. A non-transitory computer-readable medium storing instructions, wherein upon execution of the instructions by one or more hardware processors, the hardware processors perform operations comprising:
creating, by one or more hardware processors, a plurality of lightweight stateless computing processes based on process definitions in a configuration file that correspond to a plurality of activities associated with a process instance, wherein each the plurality of the activities is associated with each of the plurality of the lightweight stateless processes;
determining a first path for routing the process instance, wherein the path defines a sequence of the plurality of activities;
placing a first process of the plurality of lightweight stateless computing processes in a WAIT state;
receiving a request to initiate a process instance corresponding to the first process, the request including data associated with a first activity;
placing the first process in an EXECUTING state after receiving the request;
processing the process instance by the first process;
placing subsequent requests including data associated with the first activity in a queue associated with the first activity;
after the processing of the first process completes, determining a second activity based on the sequence of the plurality of activities defined by the first path;
after determining that a queue associated with the second activity has a queue size that exceeds a predetermined threshold:
determining a second path that defines an altered sequence of activities of the plurality of activities,
storing, as a part of historical data, the altering of the sequence of activities,
determining a next process for the process instance based on the altered sequence of activities, and
routing the process instance to the next process; and
tracking and monitoring a status of the process instance associated with each process;
wherein additional lightweight stateless processes are created for an activity if a queue size associated with the activity exceeds the predetermined threshold.

20. The computer-readable medium of claim 19, the operations further comprising:
  recording an identifier of at least one of the processes placed in the EXECUTING state and a timestamp in a micro registry corresponding to the process instance; and
  updating the micro registry to store the altering of the sequence of activities.

21. The computer-readable medium of claim 19, the operations further comprising:
  determining that one of the processes placed in the EXECUTING state has an empty queue; and
  re-placing the process in the WAIT state.

22. The computer-readable medium of claim 19, wherein processing the process instance comprises: performing the activity associated with the process placed in the EXECUTING state on the process instance.

23. The computer-readable medium of claim 19, wherein determining the next process for the process instance comprises:
  receiving runtime data; and
  determining the next process based on the runtime data using at least one of: artificial intelligence, complex event processing, historic decision paths, pattern match, or predefined rules.

24. The computer-readable medium of claim 19, wherein determining the next process for the process instance comprises:
  determining that processing for the process instance is complete; and
  ending the process instance based on the determination.

25. The computer-readable medium of claim 19, wherein the configuration file includes a process type for the activity; a process algorithm for the activity; and a trigger for the activity that causes a process to perform the activity.

* * * * *

UNITED STATES PATENT AND TRADEMARK OFFICE
CERTIFICATE OF CORRECTION

PATENT NO.      : 9,582,331 B2
APPLICATION NO. : 14/465798
DATED           : February 28, 2017
INVENTOR(S)     : Shiva Murthy et al.

Page 1 of 1

It is certified that error appears in the above-identified patent and that said Letters Patent is hereby corrected as shown below:

In the Claims

Claim 1, Column 11, Line 51, "wherein each the plurality" should read -- wherein each of the plurality, --.

Signed and Sealed this
Sixth Day of June, 2017

Michelle K. Lee
*Director of the United States Patent and Trademark Office*